Nov. 9, 1965  L. L. JOHNSON  3,216,436
MULTIPLE CONDITION RESPONSIVE GOVERNOR MECHANISM
Filed May 26, 1961  2 Sheets-Sheet 2

INVENTOR.
Lauren L. Johnson
BY
E. E. James
ATTORNEY

United States Patent Office 3,216,436
Patented Nov. 9, 1965

3,216,436
MULTIPLE CONDITION RESPONSIVE
GOVERNOR MECHANISM
Lauren L. Johnson, Westchester, Ill., assignor to General Motors Corporation, Detroit, Mich., a corporation of Delaware
Filed May 26, 1961, Ser. No. 112,887
12 Claims. (Cl. 137—28)

This invention relates to a governor mechanism operative to regulate the speed and load of an associated prime mover.

For illustrative purposes, the invention is shown and described as incorporated in a hydraulic centrifugal governor; more particularly, a Woodward PG locomotive type governor. With such a governor, the speed of an associated internal combustion engine is controlled by a hydraulic output servo which is operatively connected to regulate engine fuel supply. Operation of the output servo is in turn controlled by a speed controlling pilot valve element which is normally maintained in a neutral non-valving position by the balancing of counterforces applied thereto by a controllable speed increasing biasing means and an engine speed responsive means tending to actuate the pilot valve element in a speed decreasing direction. Speed adjustment or control is accomplished by compressing a speeder spring to vary the spring force exerted on the speed controlling valve element and thus the speed at which equilibrium or balance is obtained between the speeder spring and the speed responsive mechanism. Compressive adjustment of the speeder spring is accomplished through the operation of a second hydraulic speed setting servo controllable by a second pilot valve member. The speed setting pilot valve is shiftable to regulate the supply of hydraulic actuating fluid to and from the speed setting servo in accordance with the operator selected positioning of a speed control element and is returnable to a neutral, non-valving position by an intermediate restoring linkage when the effected adjustment of the speed setting servo corresponds to the selected position of the operator controlled element.

In addition to maintaining desired engine speed, a locomotive governor of the type indicated is operable to regulate field excitation of the engine driven generator to maintain substantially constant load on the engine for any given engine speed setting. For this purpose, the governor is provided with a third hydraulic servo mechanism which is operable to regulate a variable resistor in the generator field excitation circuit. A load controlling pilot valve member regulates the supply of hydraulic actuating fluid to and from the load control servo and is actuated by a linkage intermediate the speed setting and power output servos. This load controlling linkage is so arranged that for each speed setting there is only one fuel setting or horsepower output level at which the load control pilot valve is centered in a neutral, non-valving load maintaining position. Any change in speed setting or in engine speed caused by a change in generator load uncenters the load control pilot valve to adjust load excitation in accordance with the effected speed setting. Positioning of the load controlling linkage under such constant speed and load conditions is thus indicative of a schedule of steady state fuel rates corresponding to variations in the governor speed setting.

As regulated by the engine governing and load control mechanism, the power demand of a locomotive transmission system should never exceed the engine capabilities and should be accomplished without over or under shooting. Satisfactory engine and load acceleration varies for different types of service, however, dependent upon the road or switching load imposed upon the locomotive. Rapid engine power acceleration is essential for good switching and light road load performance. In the absence of a fuel limiting control, the provision of such a rapid engine acceleration governor characteristic for light load operation results in engine abuse and produces undesirable tractive effort under heavy road load conditions. Under such operating conditions, the resultant relatively slow acceleration of the load mass causes rapid advance of the governor output servo to its maximum fuel supply controlling position and actuates the load control pilot valve member to partially unload the accelerating engine. The resultant excess supply of fuel causes improper combustion and fuel loss and excessive exhaust smoking. In some cases, exhaust firing may also occur with resultant warpage of the exhaust manifolds and stack. Where the engine is provided with a turbocharger, such exhaust firing tends to overdrive the compressor with resultant surging further aggravating the excess fuel to air ratio with consequential excessive engine operating temperatures. Such continuous or periodic exhaust firing often results in the destructive heating and failure of the various turbine elements.

In the past, various controls have been added to such governors to limit the fuel supply and to provide variable load acceleration characteristics as functions of engine speed. The fuel supply characteristic is generally modulated to permit only a limted fuel excess corresponding to that required for proper engine and load acceleration for any given engine speed setting. Such fuel limiting controls generally require substantial modification of the basic governor structure and include either an auxiliary centrifugal governor or a measuring device responsive to an engine generated pressure proportionally indicative of engine speed. With turbocharged engines, such fuel limiting controls have generally been responsive to engine air box pressure. Such accessory control devices require precise calibration and means for converting the sensed value into a dimension capable of limiting the fuel rate with reference thereto over the entire engine speed range.

The invention contemplates a simple fuel limiting control which is easily superimposed on the load control linkage of the illustrative governor and provides variable load acceleration characteristics by modulating the rates of speed setting advance, of load reduction, and of the output servo fuel advance in accordance with predetermined departures of the load control linkage from its steady state fuel rate schedule. The fuel limiting control of the invention functions only when the load demand is at least temporarily beyond the capabilities of the engine due to slow acceleration of the load mass or transmission malfunction or failure. While having particular and specific application to the illustrative governor, the invention is deemed applicable generally and in its broader aspects to governors for various other applications, such as marine propulsion drives, engine and torque converter installations, engine driven pipe line pumps, etc.

The foregoing and other objects, advantages and features of the invention will be apparent from the following description of the illustrative embodiment, having reference to the accompanying drawings, in which.

Figure 1:
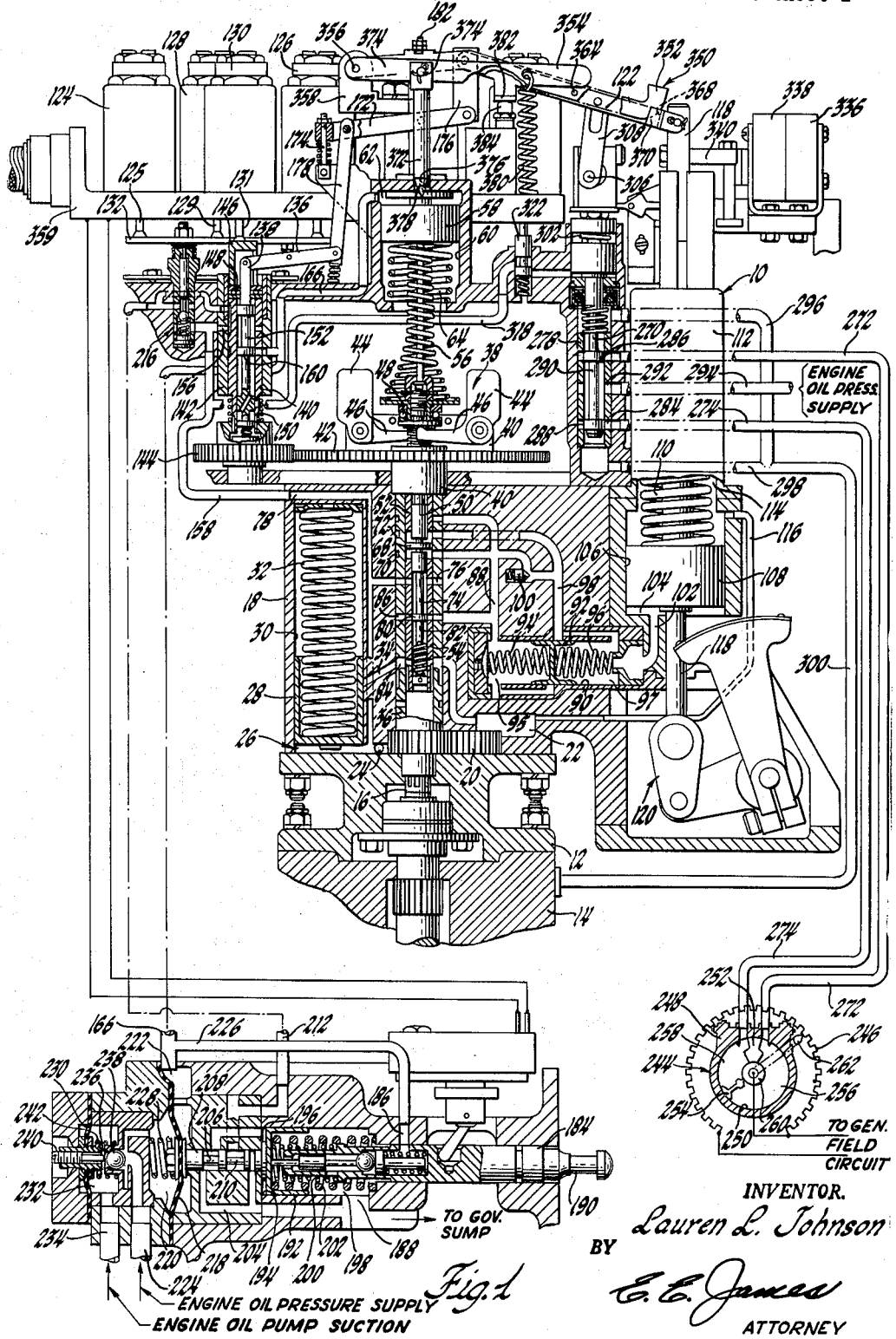
FIGURE 1 is a somewhat diagrammatic view of the illustrative governor embodying the invention.
Figure 2:
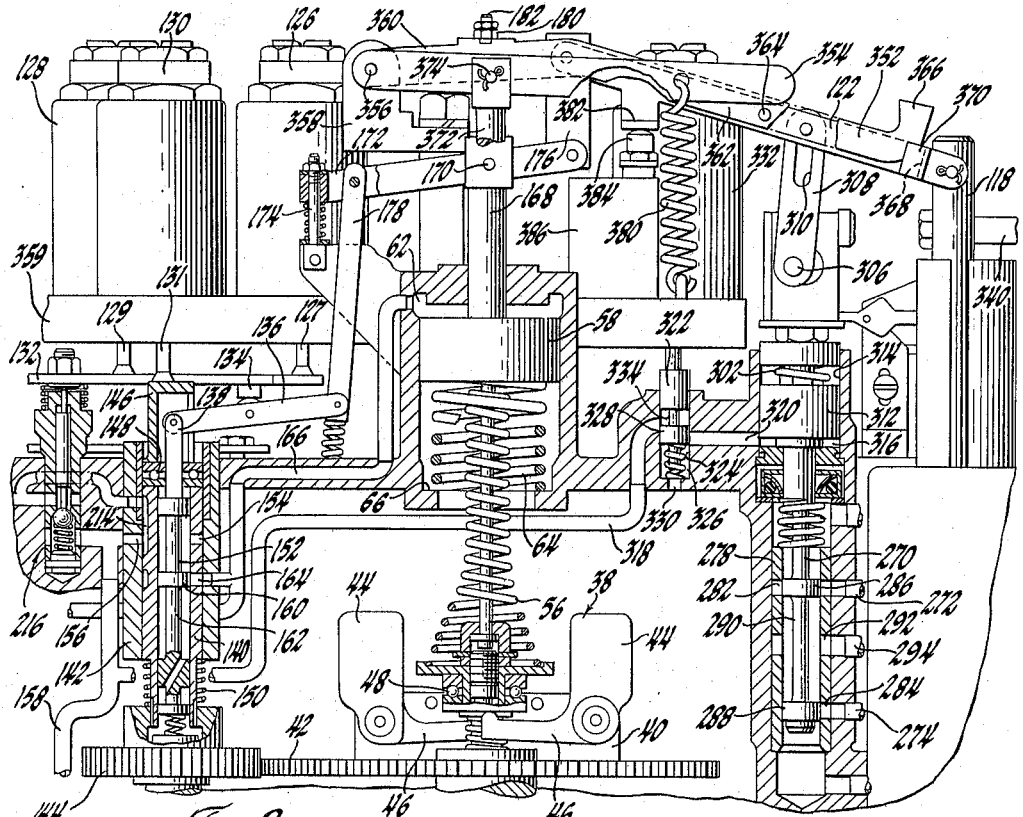
FIGURE 2 is an enlarged elevational view of a portion of FIGURE 1 and shows the fuel limiting control of the invention in greater detail.
Figure 3:
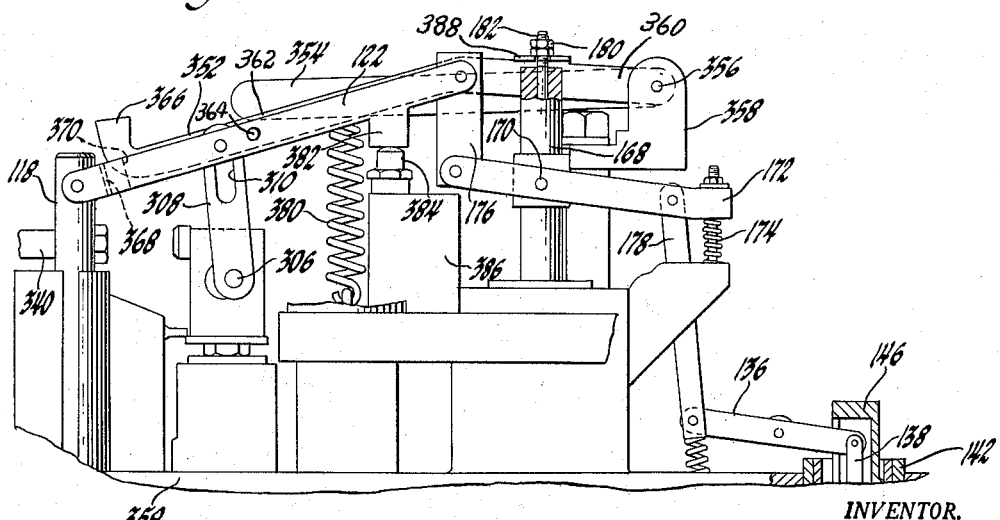
FIGURE 3 is a rear elevational view of the fuel limiting control as viewed in FIGURES 1 and 2.

Referring more particularly to FIGURE 1, the governor is indicated generally by the reference numeral 10 and includes an adapter or base member 12 which is mounted on the engine 14 and rotatably supports an engine driven stub shaft 16. A power case 18 is mounted immediately above the base 12 and houses a gear type pump 20. This pump is driven by the upper end of the shaft 16 and pumps hydraulic fluid from a casing defined sump 22 through a check valve 24 into a plurality of fluid pressure accumulators 26. These pressure accumulators each comprise a piston reciprocably mounted within a casing defined cylindrical bore 30 and biased by a spring 32 against the supplied fluid pressure. The fluid pressure storing displacement of the several accumulator pistons also regulates the pump discharge at a predetermined supply pressure by uncovering bypass passages 34 connected to the governor sump.

A pilot valve sleeve or bushing 36 is rotatably journaled in the power casing in axial alignment with the stub shaft 16 and is rotatably driven thereby through the gear pump 20. The upper end of this valve sleeve drivingly supports the engine speed responsive flyweight mechanism 38. The flyweight mechanism comprises a carrier 40 secured to the upper end of the valve sleeve. The carrier 40 is externally geared at 42 and pivotally supports two or more bellcrank flyweights 44 for speed responsive outward swinging movement. These flyweights have radially inwardly extending arms 46 which thrustably engage the underside of a ball bearing and spring seating assembly 48 carried by the upper end of a pilot valve member 50. This pilot valve member is reciprocably mounted within two axially spaced inner valve sleeve bushings 52 and 54 embraced within and rotatably driven by the valve bushing 36. A conical speeder spring 56 is compressively interposed between the spring seating assembly 48 and a piston 58 which is reciprocably mounted within a casing defined cylinder 60. The piston 58 cooperates with the cylinder 60 to define the expansible chamber 62 therebetween and is shiftable to increase the speeder spring bias on the pilot valve member 50 in accordance with speed setting fluid pressure supplied thereto. Such piston movement is in opposition to a return spring 64 which is compressively interposed between the piston and a spring seating shoulder 66 adjacent the open end of the cylinder 60.

An intermediate land 68 on the pilot valve member 50 slidably and sealingly engages the outer valve sleeve 36 and forms a compensating piston located between two axially spaced valve sleeve ports 70 and 72 and the spaced ends of the inner valve sleeves 52 and 54. A reduced diameter portion 74 on the pilot valve member is connected through a radial port 76 in the valve sleeves 36 and 54 and a passage 78 in the casing 18 to the governor pressure supply pump and accumulators. A control land 80 separates the pressure supply valve portion 74 from a second reduced diameter portion 82 formed adjacent the lower end of the pilot valve member. This lower reduced diameter portion communicates through a port 84 with the governor sump. The control land 80 slidably and sealingly engages the inner surface of the valve sleeve 54 and is operable to control fluid pressure supply to and from a port 86 extending radially through the valve sleeves 36 and 54.

A passage 88 connects the port 86 to the compensating valve port 70 and to one end of a casing defining cylinder 90. A compensating buffer piston 92 is reciprocably mounted and normally centered within the cylinder 90 by springs 94 and 96 to define two opposing expensible compensating buffer chamber 95 and 97. The expansible chamber 97 is connected through a passage 98 to the compensating valve port 72 and through a compensating needle valve 100 to the passage 88. The buffer chamber 97 is connected through a passage 102 to an expansible pressure chamber 104 formed between a casing defined cylinder 106 and a power servo piston 108 reciprocably mounted therein. A spring 110 is compressively interposed between the power piston 108 and a spring seating member 112. The member 112 is secured to the power case and, with the cylinder 106, defines a spring housing chamber 114. This spring housing chamber is vented through a passage 116 to the governor oil sump. A rod 118 is reciprocably mounted and extends through the power casing 18 and the spring housing 112 and is secured intermediate its ends for axial movement with the power piston 108. This rod is pivotally connected at its lower end to an engine fuel controlling linkage partially indicated at 120 and at its upper end to one end of a floating load control lever 122. The power piston is thus normally biased in a fuel decreasing direction by the spring 110 in opposition to fuel increasing movement imparted thereto by fluid pressure supplied to or trapped within the expansible pressure chamber 104 by the speed responsive actuation of the pilot valve member 50. The needle valve 100 is adjustable to regulate the flow of pressure fluid to and from the power cylinder and thereby the speed maintaining response of the governor. As applied to the buffer chambers 95 and 97 and to the compensating piston through the ports 70 and 72, the pressure differentials resulting from such regulation of fluid flow on opposite sides of the needle valve serve to assist in recentering the pilot valve plunger as the necessary speed maintaining fuel supply correction is made by the power piston.

Speed control of the governor is accomplished in steps by the remote selective energization of different combinations of four solenoids 124, 126, 128 and 130. The solenoids 124, 126 and 128 have armature actuated plungers 125, 127 and 129 pivotally bearing on a triangular fulcrum plate 132 at varying distances from a plate carried fulcrum 134. The fulcrum 134 pivotally engages a floating lever 136 intermediate its ends. One end of the lever 136 is pivotally connected to a speed set controlling pilot valve 138. This speed control pilot valve is reciprocably mounted within a valve bushing 140 in turn journaled and rotatably driven within a ported sleeve 142 by a gear 144 which is drivingly engaged by the flyweight carrier gear 44. The armature actuated plunger 131 of the solenoid 130 bears directly on the valve bushing 140 through a cap 146 and a bearing assembly 148 for axial shifting of the valve bushing 140 against the biasing action of a spring 150 compressively interposed between the lower end of the valve member and the gear 144.

Energization of different combinations of the several speed setting control solenoids causes the speed control pilot valve to be raised or lowered with respect to the valve bushing 140. The pilot valve 138 has an intermediate reduced diameter portion 152 which is connectable through ports 154 and 156 in the valve bushing 140 and the ported sleeve 142 and a casing defined passage 158 to the governor pressure supply passage 78. A control land 160 separates the pressure supply land 152 from a second reduced diameter portion 162 having continuous open communication through the governor housing to the sump 22. The control land 160 sealingly engages the valve bushing 140 and is operable to regulate fluid pressure supply to and from a bushing defined port 164. The port 164 is connected through a passage 166 to the expansible chamber 62 of the speed setting servo. Lowering of the speed control pilot valve thus supplies pressurized oil from the governor supply to actuate the speeder spring adjusting piston thereby increasing governor spring tension. Raising the speed control pilot valve similarly permits oil trapped above the governor speeder spring adjusting piston to drain thus lessening governor spring tension thereby lowering the governed engine speed. Energization of the solenoid 130 is equivalent to raising the speed control pilot valve since it lowers the speed control bushing 140 thereby lowering the pressure supply port opening 154 and making the downward movement of the speed control pilot valve less effective to supply pressurized fluid to the speed setting servo.

A hollow piston rod 168 is carried by the speed setting piston 58 and projects axially upwardly through the closed upper end of the cylinder 60. This piston rod is pivotally connected at 170 to a floating lever 172 having a swingable and adjustable spring biased fulcrum 174. The end of the lever 172 distal from its fulcrum is connected by a tie link 176 to the end of the load control lever 122 remote from its pivotal connection to a power piston rod 118. Swinging movement of the lever 172 about its fulcrum 174 thus adjusts the adjacent end of the load control lever in accordance with speed controlling positioning of the speed set piston 58. As the piston 58 approaches a desired speed establishing position corresponding to the effected positioning of the pivot 134, the corresponding movement imparted to the lever 172 is transmitted through a link 178 to the end of the speed controlling lever 136 opposite the pilot valve 138. The movement thus imparted to the lever 136 returns the pilot valve to a non-valving position wherein the effected adjustment of the piston 58 is maintained.

When the several speed setting solenoids 124, 126, 128 and 130 are simultaneously deenergized, the effective position of the fulcrum 134 is such that operation of the speed setting pilot valve 138 supplies a limited quantity of pressurized oil to the expansible chamber 62 sufficient to impart an idle speed maintaining bias to the speeder spring 56. Engine shutdown is effected from such an idle speed operating condition by energizing solenoid 130. This lowers the value bushing 140 relative to the pilot valve control land 160 thereby venting the chamber 62 to sump. The resultant upward movement of the piston 58 causes abutment between the upper end of the piston rod 168 and two locked nuts 180 which are threadably adjusted on the upper end of a shutdown control rod 182. The control rod 182 extends axially downwardly through the speed setting servo and speeder spring assembly and is operatively connected at its lower end to the speed and power controlling pilot valve 50. The upward movement of the speed setting piston is thus transmitted to the speed and power controlling pilot valve 50 which vents the expansible chamber 104 of the power servo and permits the spring 110 to actuate the piston 108 and the fuel control linkage 120 connected thereto to a fuel shut-off controlling position. The shutdown effecting deenergization of the solenoids 124, 126 and 128 and the simultaneous energization of the solenoid 130 is normally controlled by the locomotive engineer through operation of switches associated with a suitable controller located in the locomotive cab.

An alternative shutdown effecting valve plunger 184 is reciprocably mounted in the governor case and is operable to vent the fluid pressure supplied to the speed-setting servo through passages 186 and 188 to the governor sump thereby effecting engine shutdown. Such venting occurs whenever the valve plunger is actuated to an extreme right-hand position from that shown in FIGURE 1. The valve plunger 184 may be actuated to its venting position either manually by a projecting knob indicated at 190 or by fluid pressure actuation of a servo piston 192 in response to a failure in the engine lubrication system. The shutdown controlling servo piston 192 is reciprocably mounted in and divides a casing-defined cylinder 194 into an expansible fluid pressure actuating chamber 196 and a valve chamber 198. A relatively soft helical spring 200 compressively provides a normal valve actuating connection between the piston 192 and the valve plunger 184. A second heavier return spring 202 is compressively interposed between the piston and the opposite end of the valve chamber 198. The shutdown piston actuating chamber 196 is normally connected to the engine sump through a passage 204 by a reduced diameter portion 206 provided on a spool valve plunger 208. A second reduced diameter portion 210 on the valve plunger 208 is operable to connect the piston actuating chamber 196 to the governor oil pressure supply through a passage 212. The passage 212 is intermittently connectable to the oil pressure supply passage 158 through a longitudinally extending slot 214 in the rotatably driven valve bushing 140 or alternatively through a by-pass valve 216. The by-pass valve is actuated to an open position by the fulcrum plate 132 whenever it is adjusted beyond a certain engine speed establishing position.

The spool valve 208 is actuated by a diaphragm 218 which divides a casing defined chamber into opposed expansible chambers 220 and 222. These chambers are connected respectively through passages 224 and 226 to the engine oil pressure supply and to the governor speed-setting oil supply. The governor speed-setting pressure supplied to the diaphragm chamber 222 tends to bias the valve member 208 toward its opened, pressure supplying position. However, the valve member 208 is normally maintained in its venting position in opposition to the pressure in the chamber 222 by the engine lubricating oil pressure supplied to the chamber 220 and by a spring 228. As shown, the spring 228 is compressively interposed between a diaphragm and the opposite wall of the chamber 220. Whenever engine lubricating oil pressure drops below a safe operating schedule established by the force differential between the speed setting pressure in the chamber 222 and the deflection characteristic of the spring 228, the pressure in the chamber 222 actuates the valve 208 to its opened position. The resultant supply of actuating fluid pressure to the servo chamber 196 shifts the piston 192 to the right and actuates the shutdown controlling valve plunger 184 to its opened position wherein the speed setting pressure is vented to the engine sump. The resultant upward movement of the speed setting piston beyond its idle speed position actuates the speed and power-controlling pilot valve 50 to a position wherein it vents the expansible chamber 104 of the power servo thus permitting the spring 110 to actuate the piston 108 and the fuel control linkage 120 to their fuel shut-off controlling position.

To provide protection against restriction on the suction side of the engine lubricating oil pump, the governor shutdown control is provided with a second valve operating diaphragm 230 defining an expansible chamber 232 connectable at 234 to the engine oil pump. A port 236 intermediate the chamber 232 and the engine oil pressure supply passage 224 is normally closed by a ball-check valve 238 maintained in seating engagement therewith by the oil pressure in the passage 224. The diaphragm 230 threadably supports a valve unseating plunger 240. A compressive spring 242 normally biases the diaphragm against the pump suction applied thereto and thus maintains the plunger out of unseating engagement with the ball-check valve. Whenever the pump suction becomes excessive, however, the diaphragm 230 actuates the plunger 240 against the biasing action of the spring 242 to unseat the ball-check valve thereby venting the supplied engine oil pressure in the passage 224 to the pump suction thus simulating an engine oil pressure failure operable to effect engine shutdown.

In addition to maintaining desired engine speed, the illustrative governor is operable to regulate field excitation of an engine driven generator to maintain substantially constant load on the engine for any given engine speed setting. For this purpose, a vane type motor 244 is associated with the governor and is operable to regulate a rheostat 246 in the generator field excitation circuit. The motor 244 comprises a casing 248 defining a cylindrical motor chamber 250 which is divided by a stator vane 252 and a rotary vane 254 into load decreasing and increasing expansible chambers 256 and 258. The vane 254 is carried by a rotor hub 260 suitably journaled in the chamber defining end walls of the casing 248. An electrical contact or rheostat arm 262 is drivingly connected to the hub 260 for rotation therewith. The inner end of this contact arm is connected through a suitable commutator, not shown, to the low voltage supply connected end of the resistance 246. The opposite end of the resistance 246 is connected to the battery field excitation circuit of the generator. The outer end of the arm 262 adjustably engages the variable resistance 246 to vary the generator loading excitation current.

The field or load regulating positioning of the vane and rheostat contact arm is controlled by pilot valve 270 which is operable to alternately supply and release hydraulic actuating fluid to and from the motor chambers 256 and 258 through passages 272 and 274, respectively. The pilot valve 270 is reciprocably mounted in a valve bushing 278 having longitudinally spaced ports 282 and 284 connected respectively to the passages 272 and 274. These ports are controlled by two longitudinally spaced control lands 286 and 288 which are separated by a reduced diameter portion 290 having continuous communication with the engine oil pressure supply through an intermediate port 292 in the valve bushing and a conduit 294. The opposite ends of the bushing defined valve mounting chamber are connected through passages 296 and 298 to a drain conduit 300 leading to the engine sump.

The upper end of the load control pilot valve has a lost motion actuating connection with the load control lever 122. This connection includes an adjustable eccentric pivotal connection at 306 with the lower end of a link 308. The upper end of the link 308 is provided with a pin-and-slot lost-motion connection 310 with the load control lever 122. A spring 302 normally biases the pilot valve 270 downwardly to maintain actuating engagement between the lever carried pin and the slot of the link 308. As previously indicated, the load controlling linkage including the lever 122 is so arranged that for each speed setting there is only one fuel setting or horsepower output level at which the lost-motion connection 310 permits centering of the load control pilot valve in its neutral non-valving, load maintaining position. Thus under normal operating conditions any change in the governor speed setting or in engine speed caused by a change in generator load uncenters the load control pilot valve thereby supplying actuating fluid to the motor 244 to maintain the constant output load corresponding to the effected governor speed setting. Such positioning of the load control linkage under constant speed and load thus establishes a schedule of steady-state fuel rates corresponding to variations in the governor speed setting.

Under certain conditions of locomotive operation it is necessary to override the normal action of the load control to increase field excitation current at a time when the load control positioning of the lever 122 would normally actuate the pilot valve 270 and the vane motor 248 to increase the field excitation current. To provide such overriding control, a piston 312 is reciprocably mounted in a cylinder 314 and cooperates therewith to define an overriding expansible fluid pressure chamber 316 embracing the upper end of the load control pilot valve member 270. The piston 312 has a limited lost motion connection with and is operable to carry load control pilot valve member 270 upwardly to a field reducing valving position. Such upward movement of the pilot valve 270 is permitted by the lost motion pin-and-slot connection and is effected by governor oil pressure supply to the piston actuating chamber 316 through passages 318 and 320. Such fluid pressure supply is controlled by a spool valve plunger 322 which is reciprocably mounted in a valve bore 324 intersecting the passages 318 and 320. The valve plunger 322 is normally biased by a spring 326 to a non-valving position wherein a pressure control land 328 vents the expansible chamber 316 and passage 320 to the governor sump through a drain passage 330. A load control overriding solenoid 332 is energizable to actuate the valve plunger 322 to a pressure supplying opened position wherein a reduced diameter land 334 in communication with the governor pressure supply passage 318 supplies overriding control pressure through the passage 320 to the piston actuating chamber 316.

The solenoid 332 is energizable by a plurality of switches associated with various portions of the locomotive controlling switchgear. Such control switches are operable to energize the overriding solenoid whenever the electrical circuits between the generator and locomotive traction motor are being changed. Such circuit changes are made automatically in accordance with variations in train speed to provide proper transmission of electrical power. The resultant reduced generator field excitation protects the associated switchgear against damage from arcing which would otherwise occur during such transmission periods if high current flow were permitted in the electrical circuits to the traction motors.

The solenoid 332 may also be energized by differential relay switches responsive to slippage of the locomotive drive wheels which results in an immediate decrease of load on the traction motors and generators. When wheel slipping ceases, the overriding solenoid 332 is de-energized and the load control mechanism is restored to a balanced load maintaining condition between the engine and generator for the existing governor speed setting. In the absence of the instant overriding control mechanism, the increase in engine speed resulting from wheel slip conditions would cause the load control mechanism to increase field excitation to compensate for the loss in traction load. Such increased excitation would increase generator power output and further aggravate the wheel slipping condition.

The overriding control mechanism is also used to hold the vane motor and field rheostat in its minimum field position while the engine is running at idle and to protect against an overload power demand by the electrical transmission system which is beyond the output capabilities of the locomotive engine. For this purpose, the governor includes two limit switches 336 and 338 which are actuated by a bar 340 carried by the upper end of the power piston rod 118. Independent actuation of these switches occurs whenever the power piston rod reaches fuel supply limits corresponding to the rated and maximum speed and power capabilities of the engine.

The acceleration or fuel limiting control linkage of the invention is indicated generally by the reference numeral 350. As previously indicated, this linkage provides variable load acceleration characteristics and prevents continuous fuel oversupply due to transmission malfunction by successively and/or momentarily modulating the rates of speed setting advance, by effecting load reduction, and by modulating the output servo fuel advance in accordance with predetermined departures in the acceleration indicative positioning of the load control lever 122 from its steady state fuel rate schedule. This control linkage is further operable to effect engine shutdown where substantial malfunction of the electrical transmission system occurs.

The fuel limiting linkage 350 comprises two levers 352 and 354 which are pivotally supported at 356 by a bracket 358 mounted as shown above the upper deck 359 of the governor casing. The lever 352 is of bent configuration having a substantially horizontal portion 360 intermediate the pivot 356 and the upper end of the pilot valve carried shutdown rod 182 and having a downwardly inclined portion 362 extending therefrom. The inclined lever portion 362 is connected by a pivot pin 364 to the load control lever 122 intermediate its connection to the links 176 and 308. The end of the lever 352 distal from the pivot 356 has an upward projection 366 which is guided by a slot 368 formed in a guide member 370 carried by the load control link 122. A needle valve 372 is pivotally connected at 374 to the lever 354. This valve member is tapered at its lower end 376 and sealingly engages a valve seat defining port 378 in the upper end wall of the speed setting cylinder 60. The lever 354 is normally biased by a spring 380 to maintain the needle valve in sealing engagement with the port 378.

In its valve closed position, the lever 354 is normally spaced above a projection of the pivot pin 364 whenever the load control lever is within or near its steady state load and fuel rate maintaining schedule of movement. This normal gap between the lever 354 and the pin 364 provides a limited lost motion actuating connection therebetween. When the power piston is actuated to advance the engine fuel rate beyond the acceleration capabilities of the engine in response to an advance in the governor speed setting or a sudden increase in the output load, the resultant acceleration indicative departure of the load control lever 122 from its steady state fuel rate schedule carries the pivot pin 364 into actuating engagement with the lever 354. The resultant upwardly swinging movement imparted to the lever carries the needle valve 372 to an opened, pressure metering position thereby momentarily reducing the engine speed setting or modulating the rate of speed setting advance otherwise effected by the speed control pilot valve 138.

The inclined portion of the lever 352 is provided with a substantially horizontal lateral projection 382 intermediate the link 176 and the pivot 364. This projection is thrustably engaged by a spring biased actuating plunger 384 of a switch 386 which is operable to energize the load control overriding solenoid 332. The blade element of the switch has limited lost motion with the plunger so that the switch is actuated to energize the solenoid 332 only when the effected positioning of the lever 352 is indicative of further engine accelerating departure from steady state fuel rate conditions. The horizontal portion of the lever 352 is also provided with horizontal and laterally extending projections at 388. These projections straddle the shutdown control rod 182 between the piston rod 168 and the nuts 180 and provide a limited lost motion actuating connection engageable with the nuts 180 to carry the shutdown rod and the pilot valve 50 to an engine shutdown position whenever the position of the lever 352 is indicative of a still further acceleration indicative advance of the power piston rod clearly beyond the capabilities of the engine and electrical transmission system.

The load and fuel limiting mechanism of the invention is thus operable under extreme engine and load acceleration operative conditions to reduce momentarily and sequentially the engine speed setting or speed setting advance and generator load excitation thereby maintaining the fuel supply within the load acceleration and the fuel burning capabilities of the engine and governor and preventing a continuous excess fuel supply condition resulting from a malfunction of the electrical transmission system.

While the foregoing description has been limited to a single illustrative embodiment, it will be apparent that the several features of the invention may be used in other types of governors and similar servo control computer mechanisms and that various modifications and departures might be made therein without departing from the spirit and scope of the invention as defined in the following claims.

I claim:

1. In a hydraulic governor for an internal combustion engine, a speed responsive means, a speed setting means, an engine power controlling servomechanism including a first piston member operably connectable to regulate fuel supply to an engine between no-fuel and maximum fuel supply limits, a first valve means operable to regulate the supply of hydraulic actuating fluid to and from said power servomechanism and normally maintainable in a neutral, non-valving position by relatively equal opposing action thereon by said speed responsive and speed setting means, a second servomechanism operable to regulate the output load imposed on an engine and including a second valve means operable to regulate the supply of hydraulic actuating fluid to and from said load regulating servomechanism, said speed setting means comprising a third servomechanism including a piston movable between engine-off and maximum engine speed establishing positions and a third valve means normally operable to regulate the supply of hydraulic fluid to and from said third servomechanism to effect positioning of said speed setting piston between a minimum idle speed setting and its maximum engine speed establishing position, control means operable to actuate said third valve means in accordance with a desired governor speed setting, linkage means intermediate said third valve means, said speed setting piston, and said first piston member, said linkage means being operable to restore said third valve means to a non-valving condition to effect a predetermined schedule of steady state fuel supply when the desired speed setting has been achieved, said second valve means having a first lost-motion connection with said linkage means normally operable to modulate the hydraulic fluid supplied to said second servomechanism to maintain substantially constant engine output load for any given engine speed setting, and a fourth valve means having a second lost motion connection engageable with said linkage means to open said fourth valve means to reduce the hydraulic fluid supplied by said third valve means and thereby reduce the rate of speed setting positioning of said speed setting piston whenever the speed setting piston and power servo piston positioning of said linkage means exceeds a predetermined engine accelerating fuel schedule.

2. In a hydraulic governor as set forth in claim 1, a fifth valve means having a third lost motion connection with said linkage means and operable to modify the hydraulic fluid supplied to said second servomechanism to reduce the load imposed an engine whenever the speed setting piston and power piston positioning of said linkage means exceeds the predetermined engine accelerating fuel schedule.

3. In a hydraulic governor as set forth in claim 2, a fourth lost motion connection intermediate said linkage means and said first valve and engageable to override the speed responsive operation thereof whenever the power piston positioning of said linkage means exceeds a second schedule of engine acceleration determined by the opening of said fourth valve member, said lost motion connections cooperating with the valve members connectable therethrough to sequentially reduce and vary the positioning rates of said speed setting piston member, of said second servomechanism and of the power controlling piston in accordance with variations in the load imposed on an associated engine.

4. In a hydraulic governor for an internal combustion engine, a speed responsive means, a speed setting means, an engine power controlling servomechanism including a first piston member operably connectable to regulate fuel supply to an engine between no-fuel and maximum fuel supply limits, a first valve means operable to regulate the supply of hydraulic actuating fluid to and from said power servomechanism and normally maintainable in a neutral, non-valving position by relatively equal opposing action thereon by said speed responsive and speed setting means, said speed setting means comprising a second servomechanism including a piston movable between engine-off and maximum engine speed establishing positions and a second valve means normally operable to regulate the supply of hydraulic fluid to and from said second servomechanism to effect speed setting positioning of said speed setting piston between a minimum idle speed setting and its maximum engine speed establishing position, control means operably connected to actuate said second valve means in accordance with a desired governor speed setting, linkage means intermediate said second valve means, said speed setting piston, and said first piston member and operable to restore said second valve means to a non-valving condition to effect a predetermined schedule of steady state fuel supply when the desired speed setting has been achieved, and a lost motion connection intermediate said linkage means and said first valve and engageable to override the speed responsive operation thereof whenever the speed setting piston and power piston positioning of said linkage means exceeds a predetermined schedule of engine accelerating fuel supply thereby reducing the fuel increasing positioning rate of the power controlling piston.

5. In a hydraulic governor for an internal combustion engine, a speed responsive means, a speed setting means, an engine power controlling servomechanism including a first piston member operably connectable to regulate fuel supply to an engine between no-fuel and maximum fuel supply limits, a first valve means operable to regulate the supply of hydraulic actuating fluid to and from said power servomechanism and normally maintainable in a neutral, non-valving position by relatively equal opposing action thereon by said speed responsive and speed setting means, a second servomechanism operable to regulate the output load imposed on an engine and including a second valve means operable to regulate the supply of hydraulic actuating fluid to and from said load regulating servomechanism, said speed setting means comprising a third servomechanism including a piston movable between engine-off and maximum engine speed establishing positions and a third valve means normally operable to regulate the supply of hydraulic fluid to and from said third servomechanism to effect positioning of said speed setting piston between a minimum idle speed position and its maximum engine speed establishing position, control means operably connected to actuate said third valve means in accordance with a desired governor speed setting, linkage means intermediate said third valve means, said speed setting piston, and said first piston member, said linkage means being operable to restore said third valve means to a non-valving condition to effect a predetermined schedule of steady state fuel supply when the desired speed setting has been achieved, said second valve means having a first lost-motion connection with said linkage means normally operable to modulate the hydraulic fluid supplied to said second servomechanism to maintain substantially constant engine output load for any given engine speed setting, a fourth valve means having a second lost motion connection with said linkage means and operable to modify the hydraulic fluid supplied to said second servomechanism to reduce the load imposed on an engine whenever the speed setting piston and power piston positioning of said linkage means exceeds a predetermined engine accelerating fuel schedule, and a third lost motion connection intermediate said linkage means and said first valve and engageable to override the speed responsive operation thereof whenever the speed setting piston and power piston positioning of said linkage means exceeds a second predetermined schedule of engine acceleration fuel supply thereby reducing the fuel increasing positioning rate of the power controlling piston.

6. In a hydraulic governor for an internal combustion engine prime mover, a first servomotor means including an output member opposite to control the fuel supply and thereby the speed and power of an engine and a first pilot valve member operable to regulate the supply of hydraulic fluid to said first servomotor means to control the operative positioning of said output member, a centrifugal speed responsive means and a speeder spring means operatively connected for balanced force biasing action in opposite directions and normally maintaining said first pilot valve member in a non-valving constant speed maintaining position, a second servomotor means including a piston member operable to adjust the biasing effect of the speeder spring means thereby varying the engine speeds at which the biasing actions of said speed responsive means and said speeder spring responsive means on said first pilot valve member are balanced between a maximum engine speed maintaining position, a minimum idle speed maintaining position, and an engine-off position, said second servomotor means including a second pilot valve member operable to regulate the supply of hydraulic fluid to actuate said second servo piston member, operator controlled throttle means including a control member and a floating lever operably connected to adjust the hydraulic fluid supply control positioning of said second pilot valve member in accordance with the desired engine speed indicated by the operator selected positioning of said control member, linkage means intermediate said first servo output member, said second servo piston member and said floating lever and operable to restore said second servo pilot valve member to its non-valving position when the speed controlling positioning of said output and piston members approach steady-state fuel-supply control positions corresponding to the operator selected engine speed positioning of said control member, a third valve member operable to modulate the hydraulic fluid supplied by said second pilot valve member and thereby the rate of speeder spring adjusting positioning of said second servo piston member, a second lever for actuating said third valve member having a first lost-motion pick-up connection with said linkage means intermediate said servo output and piston members and engageable to effect opening of said third valve member whenever the fuel control positioning of said first servo output member exceeds a predetermined acceleration schedule beyond the steady state fuel rate schedule corresponding to the speed establishing positioning of said second servo piston member, and a third lever having a second lost motion connection engageable to actuate said first pilot valve member to progressively reduce and relieve hydraulic fluid pressure supply to said first servomotor means thereby reducing and limiting further fuel supply increasing positioning of said output member whenever the fuel control position of said first servo output further exceeds said acceleration schedule by a predetermined amount.

7. In a hydraulic governor for an internal combustion engine prime mover, a first servomotor means including an output member operable to control the fuel supply and thereby the speed and power of an engine and a first pilot valve member operable to regulate the supply of hydraulic fluid to said first servomotor means to control the operative positioning of said output member, a centrifugal speed responsive means and a speeder spring means operatively connected for balanced force biasing action normally maintaining said first pilot valve member in a non-valving constant speed maintaining position, a second servomotor means including a piston member operable to adjust the speeder spring means between a minimum idle speed maintaining biasing condition and a maximum engine speed maintaining biasing condition, said second means including a second pilot valve member operable to regulate the supply of hydraulic fluid to actuate said second servo piston member, operator control means for adjusting the hydraulic fluid supply control positioning of said second pilot valve member in accordance with desired engine speed, linkage means intermediate said output and piston members for restoring said second pilot valve member to its non-valving position when said first servo output member approaches an engine speed controlling position corresponding to the operator selected engine speed, a third valve member operable to modulate the hydraulic fluid supplied by said second pilot valve member and thereby the rate of speeder spring adjusting positioning of said piston member, said third valve member having a limited lost-motion pick-up connection engageable with said linkage means to effect opening of said third valve member whenever the fuel control positioning of said first servo output member exceeds a predetermined acceleration schedule of fuel supply beyond the steady state fuel rate schedule corresponding to the operator selected positioning of said second pilot valve member.

8. In a governor for an internal combustion engine prime mover, a first servomotor means including an output member operable to control the fuel supply and thereby the speed and power of an engine, an engine speed responsive means and a speed control means operatively connected for normally maintaining said output member in a constant speed maintaining position, a second servomotor means operable to adjust the speed control means between a maximum engine speed maintaining position, a minimum idle speed maintaining position, and an engine-off position, operator controlled throttle means including a control member movable to adjust said second servomotor means in accordance with desired engine speed, means intermediate said first and second servomotor means and operable to restore said control member to a neutral non-speed changing position when the speed control means approaches the operator selected position of said control member, and means operable to reduce the rate of speed setting adjustment of said speed control means whenever the fuel control positioning of said output member exceeds a predetermined acceleration schedule of fuel supply beyond the steady state fuel rate schedule indicated by the speed selected positioning of said control member.

9. In a hydraulic governor for an internal combustion engine, a speed responsive means, a speed setting means, an output servo and a servo controlling pilot valve member normally maintainable in a neutral, non-valving position by the equal opposing biasing action of said speed responsive and speed setting means, said speed setting means comprising a second servo including a speed setting piston movable between engine-off and maximum engine speed establishing positions, control means including a second pilot valve member normally operable to supply hydraulic fluid to said second servo to effect desired speed setting positioning of said piston between a minimum idle speed setting and its maximum engine speed establishing position, linkage means intermediate said second valve and said speed setting piston and responsive to the positioning of said output controlling pilot valve to restore said second valve member to a non-valving position when the desired speed setting has been achieved, a third valve member operable to modulate the hydraulic fluid supplied by said second pilot valve member and thereby the rate of speed setting positioning of said piston member, and a limited lost motion connection engageable between said linkage means and said third valve member to effect opening of said third valve member whenever the output pilot valve responsive positioning of said linkage means exceeds a predetermined engine accelerating schedule.

10. In a hydraulic governor as set forth in claim 9, a second lost motion connection intermediate said linkage means and said output servo pilot valve and engageable to override the speed controlling operation thereof whenever the output pilot valve responsive positioning of said linkage means exceeds a second schedule of engine acceleration determined by the operation of said third valve member, and said first and second lost motion connections cooperating with the valve members connectable therethrough to sequentially reduce the rate of speed setting positioning of said piston member and of the governor output servo.

11. In a hydraulic governor for an internal combustion engine, a speed responsive means, a speed setting means, an engine power controlling servo, a first pilot valve member operable to supply actuating hydraulic fluid to said power servo and normally maintainable in a neutral, non-valving position by opposing action thereon by said speed responsive and speed setting means, said speed setting means comprising a second servo including a speed setting piston movable between engine-off and maximum engine speed establishing positions, a second pilot valve member normally operable to supply hydraulic fluid to said second servo to effect speed setting positioning of said piston between a minimum idle speed setting and its maximum engine speed establishing position, control means operably connected to actuate said second valve member in accordance with a desired governor speed setting, and linkage means intermediate said second valve control means, said speed setting piston and said power servo and operable to restore said second valve member to a non-valving position when the desired speed setting has been achieved, a third valve member having a limited lost motion connection with said linkage means and operable to modulate the rate of hydraulic fluid supplied by said second pilot valve member and thereby the rate of speed setting positioning of said piston member whenever the power servo positioning of said linkage means exceeds a predetermined engine accelerating schedule.

12. In a hydraulic governor as set forth in claim 11, a second lost motion connection intermediate said linkage means and said first pilot valve and engageable to override the speed responsive operation thereof whenever the power servo positioning of said linkage means exceeds a second schedule of engine acceleration determined by the operation of said third valve member, said first and second lost motion connections cooperating with the valve members connectable therethrough to sequentially reduce the positioning rate of said speed setting piston member and of the governor output servo.

References Cited by the Examiner
UNITED STATES PATENTS

| | | | |
|---|---|---|---|
| 2,472,924 | 6/49 | Schwender | 137—35 X |
| 2,533,231 | 12/50 | Drake | 137—34 |
| 2,542,765 | 2/51 | Gillespie | 137—34 X |
| 2,621,301 | 12/52 | Schwender | 137—34 X |

ISADOR WEIL, *Primary Examiner.*

M. CARY NELSON, *Examiner.*

UNITED STATES PATENT OFFICE
CERTIFICATE OF CORRECTION

Patent No. 3,216,436                            November 9, 196.

Lauren L. Johnson

It is hereby certified that error appears in the above numbered patent requiring correction and that the said Letters Patent should read as corrected below.

Column 3, line 62, for "expensible" read -- expansible -- line 63, for "chamber" read -- chambers --; column 11, line 48 for "opposite" read -- operable --.

Signed and sealed this 6th day of September 1966.

(SEAL)
Attest:

ERNEST W. SWIDER                                    EDWARD J. BRENNE
Attesting Officer                                        Commissioner of Patent